United States Patent
Price et al.

(10) Patent No.: US 6,820,601 B1
(45) Date of Patent: Nov. 23, 2004

(54) FREEZE-RESISTANT POSITIVE CRANKCASE VENTILATION VALVE

(75) Inventors: John M Price, Livonia, MI (US); Michael P Lindberg, Novi, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/646,210

(22) Filed: Aug. 21, 2003

(51) Int. Cl.[7] .............................................. F02M 25/06
(52) U.S. Cl. ...................................................... 123/574
(58) Field of Search ................................ 123/572–574

(56) References Cited

U.S. PATENT DOCUMENTS

| | | | | |
|---|---|---|---|---|
| 4,090,477 A | * | 5/1978 | Gockel .................. | 123/406.11 |
| 4,399,799 A | * | 8/1983 | Romblom et al. ..... | 123/568.22 |
| 6,546,921 B1 | * | 4/2003 | Callahan ..................... | 123/573 |
| 6,640,793 B1 | * | 11/2003 | Kabat et al. ................. | 123/574 |

* cited by examiner

Primary Examiner—Marguerite McMahon
(74) Attorney, Agent, or Firm—Ralph E. Smith

(57) ABSTRACT

A positive crankcase ventilation valve for venting crankcase gases from a crankcase of an engine has a valve casing with an inlet adapted to communicate with the crankcase and an outlet adapted to communicate with an engine intake manifold for the flow of crankcase gases drawn from the crankcase through the valve casing by the engine manifold when the engine is running. A metering pintle reciprocates in the casing. A crossbar extends across the casing adjacent to the inlet. A spring presses the pintle against the crossbar when the engine is not running. The pintle is moved away from the crossbar against the pressure of the spring by the flow of the crankcase gases when the engine is running to meter the flow of the crankcase gases. The crossbar is a narrow roll pin so that if moisture between the roll pin and pintle freezes when the engine is not running, the frozen moisture will quickly break away when the engine is started.

5 Claims, 1 Drawing Sheet

FREEZE-RESISTANT POSITIVE CRANKCASE VENTILATION VALVE

FIELD OF THE INVENTION

This invention relates generally to crankcase ventilation valves and more particularly to a freeze-resistant positive crankcase ventilation valve.

BACKGROUND OF THE INVENTION

Crankcase ventilation valves are provided to vent blow-by gases from the crankcase of an internal combustion engine and return such gases to the intake manifold. Typically, such valves have a pintle for metering the gases which closes when the engine is shut down. Often, in cold weather, especially in very cold climates, the pintle freezes in the closed position. Then when the engine is restarted, the pintle remains frozen shut and does not re-open, or opening is delayed until the engine warms up to produce enough heat to unfreeze or thaw the pintle. Until the pintle is unfrozen, the blow-by gases cannot be vented from the crankcase. To avoid such delay, electric heating devices have been employed, at considerable expense.

SUMMARY OF THE INVENTION

In accordance with this invention, a crossbar extends across the path of the pintle so that when the engine shuts down the pintle does not close all the way against the usual valve seat but rather closes against the crossbar. In that way, the valve is open even when the engine is not running. The crossbar is a relatively narrow member having a reduced area of contact with the pintle so that any freezing of moisture between the crossbar and the pintle is quickly broken away when the engine is turned on and the pintle resumes its normal operation. Even if there is a slight delay in the unfreezing of the pintle, the blow-by gases can still be vented because the pintle never fully closes and the valve remains open at all times.

Further in accordance with the invention, the ventilation valve has an elongated valve casing having an inlet adapted to communicate with the crankcase and an outlet adapted to communicate with an engine intake manifold for the flow of crankcase gases drawn from the crankcase through the valve casing by the engine intake manifold when the engine is running. The metering pintle reciprocates in the casing. The crossbar extends across the casing adjacent to but spaced outwardly of the inlet. A spring presses the pintle against the crossbar when the engine is not running. However, because the crossbar is spaced from the inlet, the valve is open even when the engine is not running. The pintle is moved away from the crossbar against the pressure of the spring by the intake manifold vacuum when the engine is running to meter the flow of the crankcase gases. Preferably, the crossbar is a roll pin.

One object of this invention is to provide a freeze-resistant positive crankcase ventilation valve having the foregoing features and capabilities.

Another object is to provide a freeze-resistant positive crankcase ventilation valve which is composed of a relatively few simple parts and is inexpensive to manufacture and assemble.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description of the accompanying drawings wherein.

DETAILED DESCRIPTION OF THE PREFERRED EMBODIMENT

The following description of the preferred embodiment is merely exemplary in nature and is in no way intended to limit the invention, its application, or uses.

Figure 1:
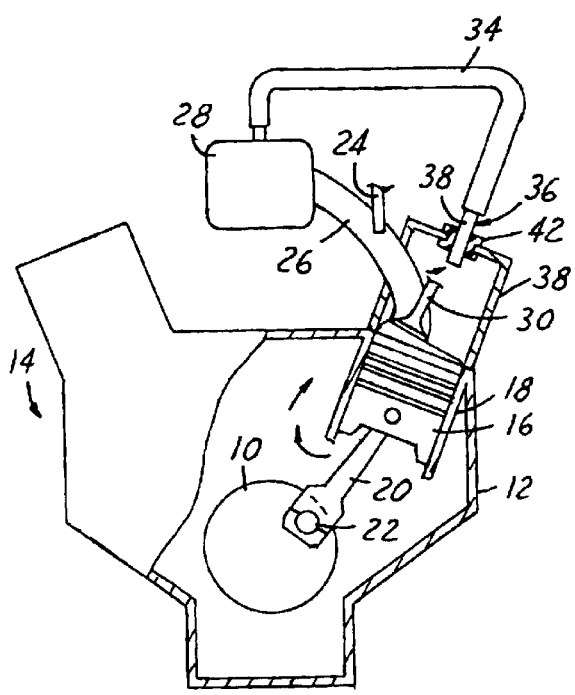
FIG. 1 is a diagrammatic view with parts in section of an internal combustion engine having a freeze-resistant positive crankcase ventilation valve for venting the crankcase of the engine, constructed in accordance with the invention.
Figure 2:
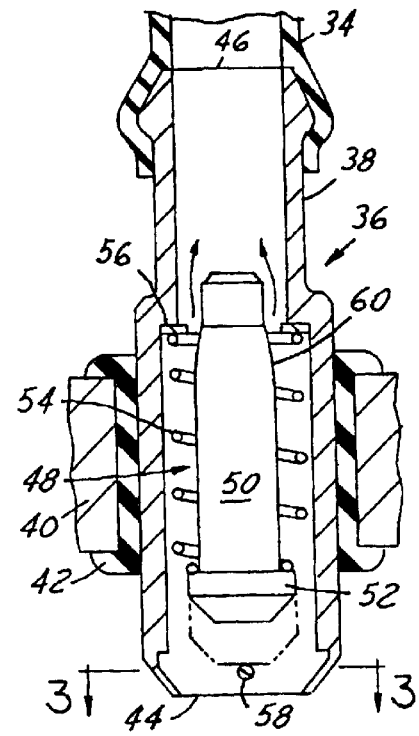
FIG. 2 is a sectional view of the ventilation valve.
Figure 3:
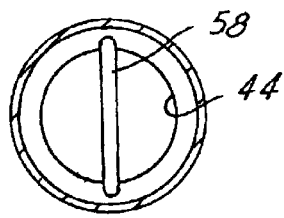
FIG. 3 is a sectional view taken on the line 3-3 in FIG. 2.

Referring now more particularly to the drawings, and especially to FIGS. 1-3, there is shown diagrammatically a crankshaft 10 mounted for rotation in a crankcase 12 of an internal combustion engine 14 of an automotive vehicle. A piston 16 reciprocates in a cylinder 18. A piston rod 20 is pivoted to the piston 16 and to a crank 22 on the crankshaft 10 to rotate the crankshaft. A fuel injector 24 injects fuel into an air passage 26 from an air intake manifold 28 to create a fuel-air mixture delivered to the cylinder 18 by a valve 30. The engine thus described is well-known in the prior art.

In the normal operation of the engine, blow-by gases pass between the piston 16 and the wall of the cylinder 18 into the crankcase. See arrows in FIG. 1. The blow-by gases should be removed from the crankcase but are not vented directly to the atmosphere because of environmental concerns. Instead, the blow-by gases are returned to the intake manifold 28 by a hose 34 through a freeze-resistant positive crankcase ventilation valve 36. The ventilation valve 36 has an elongated valve casing 38 which is secured to a valve cover 40 by a grommet 42 so that the inlet end of the valve communicates with the crankcase and the outlet end is connected to the hose 34.

The ventilation valve casing 38 has an inlet 44 at the inner end which communicates directly with the interior of the crankcase 12, and has an outlet 46 at the outer end fitted in an end of the hose 34. A pintle 48 reciprocates in the casing. The pintle 48 has an elongated cylindrical body 50 and a head 52 at the inner end. A compression coil spring 54 encircles the body 50 of the pintle and presses against the head 52 and against an abutment ring 56 in the casing to urge the pintle inwardly toward a crossbar 58. The crossbar 58 is preferably a relatively narrow, small diameter, cylindrical roll pin and extends across the casing adjacent to but spaced outwardly from the inlet and has its ends secured to the innerwall of the casing.

The pintle body 50 has a tapered metering portion 60 near its outer end to cooperate with the ring 56 in metering the flow of blow-by gases.

In operation, and when the engine is running, the intake manifold 28 produces a vacuum in the hose 34 which draws crankcase gases, that is blow-by gases, from the crankcase through the ventilation valve 36. The flow of blow-by gases through the ventilation valve causes the pintle to move outwardly away from the roll pin 58 to the solid line position of FIG. 2 against the pressure of the spring 54 to meter the flow of blow-by gases.

When the engine is not running, and the intake manifold does not create a vacuum in the hose 34, the pintle is pressed against the roll pin 58 by the spring 54 to the position shown in broken lines in FIG. 2. In this position, the inlet 44 remains open.

The roll pin 58 is circular and very narrow in cross-section and has a reduced area of contact with the head 52 of the pintle. Should moisture collect and freeze the head of the pintle to the roll pin, as it is prone to do in cold weather, the frozen moisture is quickly broken away and will not resist movement of the pintle away from the roll pin when the engine is started. Even if there is some momentary delay in the breaking away of the pintle, the heat of the engine will quickly unfreeze the small amount of moisture to release the pintle when the engine is started.

Figure 4:
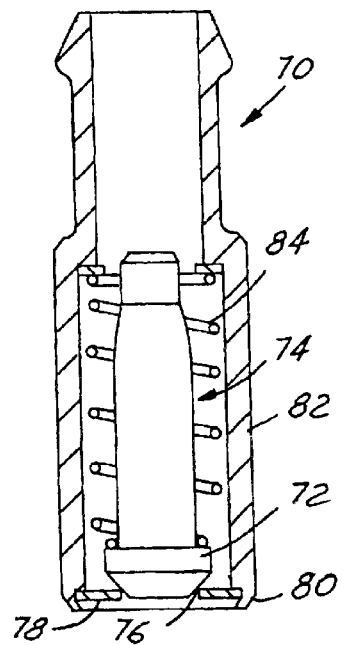
FIG. 4 is a sectional view of a ventilation valve in accordance with a prior art construction.

FIG. 4 shows a ventilation valve 70 of a prior art construction in which the head 72 of the pintle 74 is adapted to close against a circular seat 76 provided by a sealing ring 78 at the inlet end 80 of the valve casing 82. FIG. 4 shows the head 72 in the closed position pressed against the seat 76 by a spring 84 when the engine is not running. The problem with this prior art construction is that the valve head 72 contacts the seat 76 of the sealing ring 78 around a full 360° when the engine is not running and any frozen moisture between the pintle head 72 and the seat 76 will freeze the pintle in the closed position. The amount of frozen moisture is large because the contact area between the valve head 72 and the seat 76 is large. As stated previously, the pintle does not re-open, or opening is delayed until the engine warms up sufficiently to produce the necessary heat to unfreeze the pintle. This takes time and significantly delays the opening of the ventilation valve. However, in the construction of this invention shown in FIGS. 2 and 3, the amount of frozen moisture is very small because of the greatly reduced area of contact between the roll pin and the head 52 of the pintle. Also, in the construction of FIGS. 2 and 3, the valve remains open even when the engine is not running and the head of the pintle is in contact with the roll pin, so that blow-by gases can be drawn through the ventilation valve as soon as the engine is started irrespective of the position of the pintle. In the prior art construction, on the other hand, the valve 70 is closed when the pintle head 72 is seated against the valve seat 76 so that gases cannot be vented until the pintle head breaks away from the seat 76.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A positive crankcase ventilation valve for venting crankcase gases from a crankcase of an engine of an automotive vehicle, comprising:

an elongated valve casing having an inlet at one end adapted to communicate with the crankcase and an outlet at an opposite end adapted to communicate with an engine manifold for the flow of crankcase gases drawn from the crankcase through the valve casing by the engine manifold when the engine is running, a metering pintle in said casing reciprocable inwardly toward the inlet and outwardly toward the outlet, a crossbar in and extending across said casing adjacent to but spaced outwardly of said inlet, and a pressure member resiliently pressing said pintle inwardly against said crossbar when the engine is not running, said pintle being reciprocable outwardly away from said crossbar against the pressure of said pressure member by the flow of the crankcase gases when the engine is running to meter the flow of the crankcase gases.

2. The positive crankcase ventilation valve of claim 1 wherein said crossbar is narrow and circular in cross-section to minimize the area of contact with said pintle when the engine is not running, whereby any frozen moisture between the crossbar and the pintle will quickly break away when the engine is started.

3. The positive crankcase ventilation valve of claim 2, wherein said crossbar is a roll pin.

4. The positive crankcase ventilation valve of claim 3, wherein said pressure member is a compression coil spring.

5. The positive crankcase ventilation valve of claim 4, wherein said inlet is open at all times even when said pintle is pressed against the crossbar and the engine is not running.

\* \* \* \* \*